US009574658B2

(12) United States Patent
Terai et al.

(10) Patent No.: US 9,574,658 B2
(45) Date of Patent: Feb. 21, 2017

(54) SHIFT-BY-WIRE CONTROL APPARATUS

(71) Applicant: Fuji Jukogyo Kabushiki Kaisha, Tokyo (JP)

(72) Inventors: Koichiro Terai, Tokyo (JP); Taichi Tsuji, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/853,805

(22) Filed: Sep. 14, 2015

(65) Prior Publication Data
US 2016/0076645 A1   Mar. 17, 2016

(30) Foreign Application Priority Data

Sep. 16, 2014 (JP) ................................. 2014-187319

(51) Int. Cl.
*F16H 61/12* (2010.01)
*F16H 59/50* (2006.01)
*F16H 63/48* (2006.01)

(52) U.S. Cl.
CPC .............. *F16H 61/12* (2013.01); *F16H 59/50* (2013.01); *F16H 63/48* (2013.01);
(Continued)

(58) Field of Classification Search
CPC .. F16H 61/12; F16H 59/50; F16H 2061/1208; F16H 63/48; F16H 2061/1232; F16H 2061/1284
(Continued)

(56) References Cited

U.S. PATENT DOCUMENTS 5,581,233 A * 12/1996 Barr ..................... E05B 77/54
200/61.88
2008/0028879 A1* 2/2008 Robinette ............. F16H 59/105
74/335
(Continued)

FOREIGN PATENT DOCUMENTS

JP    2003-156140 A    5/2003
JP    2007-170546 A    7/2007
(Continued)

OTHER PUBLICATIONS

Japanese Office Action dated Feb. 2, 2016 with an English translation thereof.
(Continued)

*Primary Examiner* — Roger Pang
(74) *Attorney, Agent, or Firm* — McGinn IP Law Group, PLLC

(57) ABSTRACT

A shift-by-wire control apparatus includes: a first detector that detects a first vehicle state; a second detector that detects a second vehicle state; an auto parking controller that executes an auto parking control irrespective of a state of a shift range, on conditions that detection results derived from the first and second detectors satisfy respective predetermined conditions; and a malfunction determining unit that determines that the first detector is malfunctioning, on a condition that the first detector fails to detect a change in the first vehicle state. The auto parking controller executes, based on the detection result derived from the second detector, the auto parking control irrespective of the detection result derived from the first detector, on a condition that the first detector is determined by the malfunction determining unit as malfunctioning.

3 Claims, 4 Drawing Sheets

(52) U.S. Cl.
CPC ............... *F16H 2061/1208* (2013.01); *F16H 2061/1232* (2013.01); *F16H 2061/1284* (2013.01)

(58) Field of Classification Search
USPC ..................................................... 701/62, 63
See application file for complete search history.

(56) References Cited

U.S. PATENT DOCUMENTS

2008/0040009 A1\* 2/2008 Kamada ................ B60K 37/06
701/51
2011/0202231 A1 8/2011 Ueno et al.

FOREIGN PATENT DOCUMENTS

| | | |
|---|---|---|
| JP | 2013-083330 A | 5/2013 |
| JP | 2013-199963 A | 10/2013 |
| WO | WO 2010/097936 A1 | 9/2010 |

OTHER PUBLICATIONS

JPO Decision to Grant dated Jul. 5, 2016 with an English translation thereof.
JPO Notification of Reasons for Refusal dated Feb. 2, 2016 with an English translation thereof.

\* cited by examiner ured SHIFT-BY-WIRE CONTROL APPARATUS

CROSS-REFERENCE TO RELATED APPLICATIONS

The present application claims priority from Japanese Patent Application No. 2014-187319 filed on Sep. 16, 2014, the entire contents of which are hereby incorporated by reference.

BACKGROUND

The technology relates to an automatic transmission that utilizes a shift-by-wire system in which shift ranges are automatically switched from one to another with use of an actuator. In particular, the technology relates to a shift-by-wire control apparatus that forcibly switches any shift range to a parking range in response to a state of a vehicle.

A vehicle automatic transmission may utilize a shift-by-wire system in which shift ranges, including a drive (D) range, a reverse (R) range, a neutral (N) range, and a parking (P) range, are switched from one to another with use of an actuator such as a solenoid. For such an automatic transmission, for purpose of improving safety, an auto parking control technique is known in which any shift range is forcibly switched to the parking range, on a condition that the shift range other than the parking range is set when a driver has stopped a vehicle and leaves the vehicle.

For example, Japanese Unexamined Patent Application Publication (JP-A) No. 2013-199963 discloses a technique in which any shift range is forcibly switched to the parking range by determining that a vehicle is in preparation for stopping, on conditions that a door at a driver's seat is detected as being open and a seat belt of a driver is detected as being not fastened by the driver. For another example, JP-A No. 2003-156140 discloses a technique in which any shift range of a vehicle is forcibly shifted to the parking range, on a condition that the shift range other than the parking range is set upon detection of driver's action of leaving a vehicle. Furthermore, for purposes of preventing erroneous operation and improving safety, JP-A No. 2007-170546 discloses a technique in which any shift range is switched to the parking range, on a condition that a vehicle speed is less than a predetermined speed, a seat belt is not fastened by a driver, and a load applied onto a driver's seat is equal to or less than a predetermined value.

SUMMARY

In the techniques disclosed in JP-A Nos. 2013-199963, 2003-156140, and 2007-170546 described above, there is a possibility that any shift range may not be switched to the parking range when, without limitation, malfunction occurs for some reason to a seat belt switch that detects non-fastening of a seat belt by a driver. In other words, under circumstances where, without limitation, the seat belt switch still detects fastening of the seat belt despite the releasing (i.e., non-fastening) of the seat belt by the driver, any shift range may not be switched to the parking range.

It is desirable to provide a shift-by-wire control apparatus that makes it possible to switch any shift range to a parking range properly.

An aspect of the technology provides a shift-by-wire control apparatus that drives, based on an electrical signal corresponding to a shift range selected by a shift lever, an actuator to perform a shift change. The shift-by-wire control apparatus includes: a first detector that detects a first vehicle state attributed to a behavior of a driver; a second detector that detects a second vehicle state, in which the second vehicle state is attributed to a behavior of the driver and is different from the first vehicle state; an auto parking controller that executes an auto parking control irrespective of a state of the shift range selected by the shift lever, on conditions that a detection result derived from the first detector and a detection result derived from the second detector satisfy respective predetermined conditions, in which the auto parking control allows the state of the shift range to be switched to a parking range; and a malfunction determining unit that determines that the first detector is malfunctioning, on a condition that the first detector fails to detect a change in the first vehicle state. The auto parking controller executes, based on the detection result derived from the second detector, the auto parking control irrespective of the detection result derived from the first detector, on a condition that the first detector is determined by the malfunction determining unit as malfunctioning.

The first detector may be a seat belt switch that detects that the driver fastens a seat belt. The second detector may be a door switch that detects that a door of a vehicle is open or closed. The malfunction determining unit may determine that the seat belt switch is malfunctioning, on a condition that the malfunction determining unit senses no change in the detection result derived from the seat belt switch, during a time period from a timing at which the driver enters the vehicle up to a timing at which a running speed of the vehicle reaches a predetermined speed. An event that the door switch detects that the door is open may allow the auto parking controller to execute the auto parking control irrespective of the detection result derived from the seat belt switch, on the condition that the seat belt switch is determined by the malfunction determining unit as malfunctioning.

DETAILED DESCRIPTION

Figure 1:
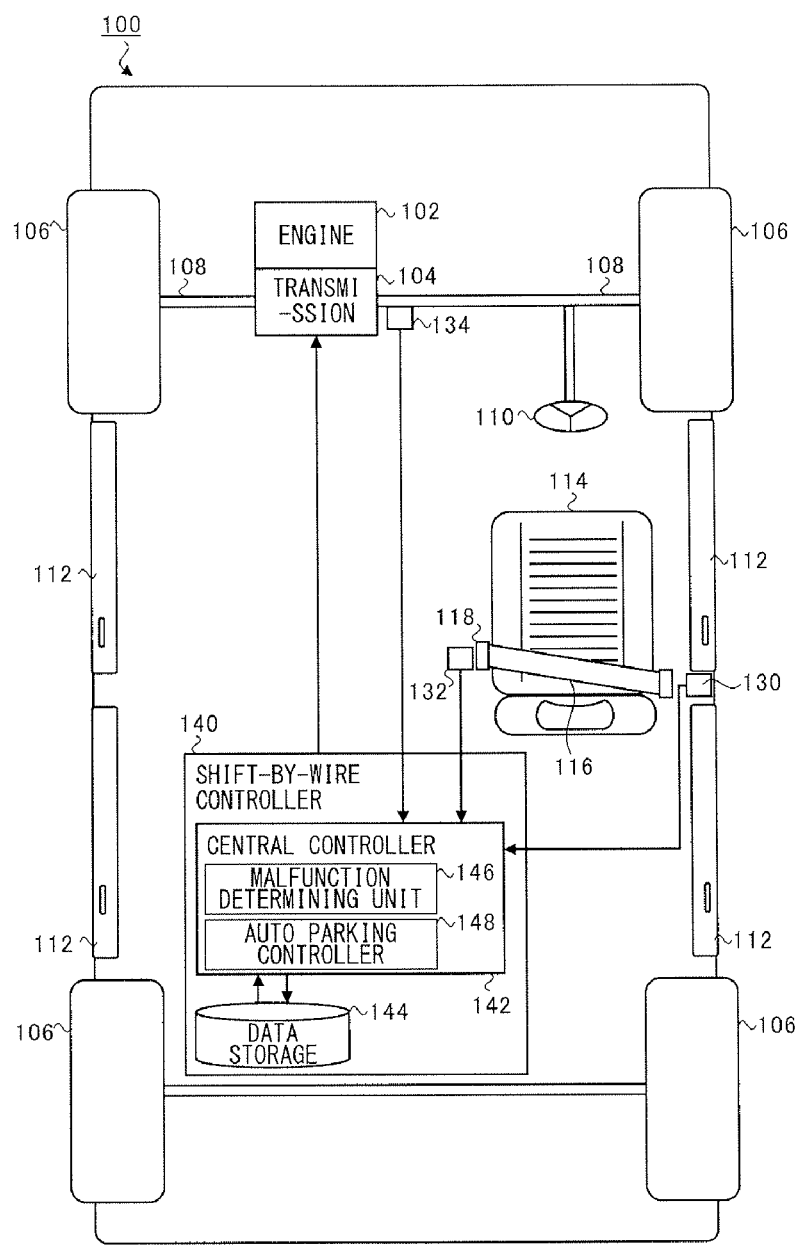
FIG. 1 describes an overall configuration of a vehicle.

In the following, some preferred implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Throughout the present specification and the drawings, elements having substantially the same function and configuration are denoted with the same reference numerals to avoid any redundant description. Also, elements that are not directly related to the technology are unillustrated in the drawings.

FIG. 1 describes an overall configuration of a vehicle 100. The vehicle 100 may include an engine 102, a transmission 104, drive wheels 106, a drive shaft 108, a steering 110, doors 112, a driver's seat 114, a seat belt 116, a door switch 130, a seat belt switch 132, a vehicle speed sensor 134, and a shift-by-wire control apparatus 140. The engine 102 is a drive source of the vehicle 100, and transmits power to the drive wheels 106 through the transmission 104 and the drive shaft 108. The transmission 104 has shift ranges, and switches the shift ranges from one to another on the basis of control instructions given from the shift-by-wire control apparatus 140 to convert the number of revolutions and torque of the engine 102 to those suitable for running of the vehicle 100. The steering 110 allows for steering of the vehicle 100.

The transmission 104 is an automatic transmission (AT) such as, but not limited to, a continuously-variable transmission and a planetary-gear-based step AT. The transmission 104 performs, with use of a range switcher, a shift change between a drive (D) range, a reverse (R) range, a neutral (N) range, and a parking (P) range, in response to a shift range selected by a shift lever. The shift lever may be provided near the driver's seat 114 in the vehicle 100. The range switcher is of a so-called shift-by-wire system in which the shift change is performed based only on an electrical signal, instead of being of a system in which the shift change is performed based on a linkage mechanism mechanically connected with the shift lever. More specifically, the range switcher may include a manual valve, a parking lock mechanism, electric actuators, and the shift-by-wire control apparatus 140. The manual valve selectively supplies hydraulic pressure to a forward clutch or a reverse clutch. The parking lock mechanism mechanically locks an output shaft of the transmission 104. The actuators drive the manual valve and the parking lock mechanism through devices such as, but not limited to, motors and solenoids. The shift-by-wire control apparatus 140 controls driving of the actuators.

The shift-by-wire control apparatus 140 may detect, with use of a range switch, a range position selected by the shift lever, and drive the actuators in response to a detection result derived from the range switch to perform the following example control. The D range may engage the forward clutch and disengage the reverse clutch. The R range may disengage the forward clutch and engage the reverse clutch. The N range may disengage both the forward clutch and the reverse clutch. The P range may disengage both the forward clutch and the reverse clutch, and actuate the parking lock mechanism. The shift lever may be provided with a self-returning mechanism that causes the shift lever to return to a predetermined home position automatically after a driver has finished operating the shift lever.

The doors 112 allow occupants including the driver to enter and leave the vehicle 100. Around the doors 112 is the door switch 130 that detects that the door 112 located at the driver's seat 114 is open or closed.

Around the driver's seat 114 is the seat belt 116 provided with an anchor 118 and adapted to constrain a body of the driver to the driver's seat 114. The anchor 118 may be provided with the seat belt switch 132. The seat belt switch 132 may detect that the driver fastens the seat belt 116 (defined as a "fastened state" or "OFF") upon fastening of the seat belt 116 by the driver, and detect that the driver does not fasten the seat belt 116 (defined as a "unfastened state" or "ON") upon non-fastening of the seat belt 116 by the driver.

Around the drive shaft 108 is the vehicle speed sensor 134 that detects a running speed of the vehicle 100.

The shift-by-wire control apparatus 140 may include a central controller 142 and a data storage 144. The central controller 142 may include a semiconductor integrated circuit, and control the shift-by-wire control apparatus 140 as a whole. The semiconductor integrated circuit may have devices such as, but not limited to, a central processing unit (CPU), ROM in which programs, etc., are stored, and RAM serving as a work area. The central controller 142 may function as, or may have, a malfunction determining unit 146 and an auto parking controller 148 to be described later. The data storage 144 may include a memory such as, but not limited to, RAM, a flash memory, and HDD, and store various pieces of information necessary for processing performed by the central controller 142.

The malfunction determining unit 146 may determine that a switch, a sensor, or any other equivalent (each of which may be a non-limiting example of a "first detector") that detects a vehicle state attributed to a behavior of a driver is malfunctioning, on a condition that the first detector fails to detect a change in the vehicle state despite an occurrence of the change in the vehicle state supposed to be detected by the first detector. A description is given here of the present implementation by referring to a non-limiting example in which the seat belt switch 132 serves as the first detector to be subjected to the determination on malfunction. More specifically, the malfunction determining unit 146 may determine that the seat belt switch 132 is malfunctioning, on a condition that the malfunction determining unit 146 senses no single change in a detection result derived from the seat belt switch 132, during a time period from a timing at which the driver enters the vehicle 100 up to a timing at which a running speed of the vehicle 100 reaches a predetermined speed. Note that the "vehicle state attributed to a behavior of a driver" detected by the first detector may be an example of a "first vehicle state".

Figure 2A:
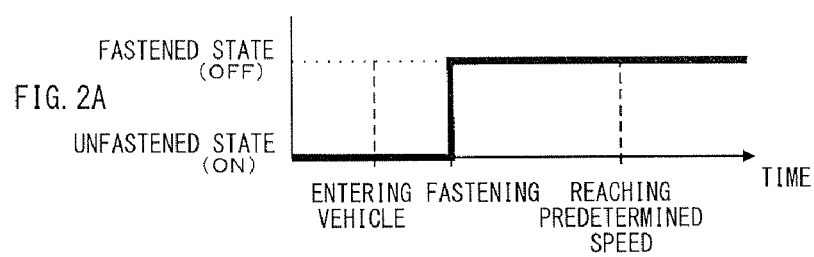
FIGS. 2A to 2C each describe a transition of a detection result derived from a seat belt switch.
Figure 2B:
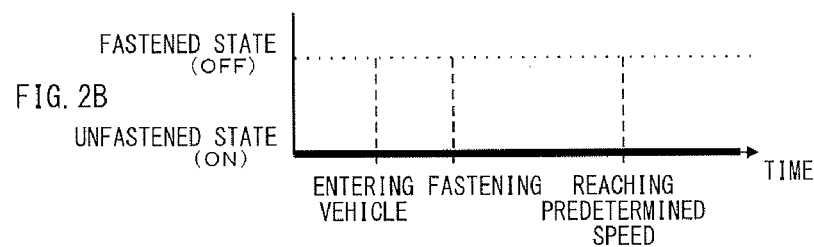
Figure 2C:
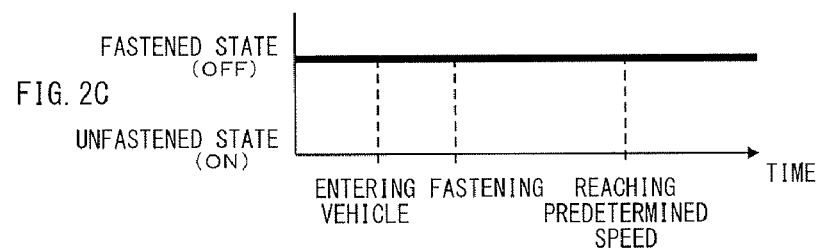

FIGS. 2A to 2C each describe a transition of the detection result derived from the seat belt switch 132. FIGS. 2A to 2C each illustrate a transition between the ON state and the OFF state of the seat belt switch 132 upon fastening of the seat belt 116 by the driver at any timing from the entering of the driver into the vehicle 100 up to the reaching of the running speed of the vehicle 100 to the predetermined speed.

Referring to FIG. 2A, the detection result derived from the seat belt switch 132 makes a transition from the unfastened state (ON) to the fastened state (OFF) at the timing of fastening the seat belt 116, under a circumstance in which the seat belt switch 132 operates normally. This allows the malfunction determining unit 146 to sense the change in the detection result of the seat belt switch 132, and the malfunction determining unit 146 thus determines that the seat belt switch 132 is not malfunctioning.

On the other hand, under a circumstance in which the seat belt switch 132 is malfunctioning and thus fixed in the unfastened state (ON), the detection result derived from the seat belt switch 132 fails to make the transition from the unfastened state to the fastened state and thus keeps on indicating the unfastened state as illustrated in FIG. 2B, even when the driver fastens the seat belt 116. Hence, the malfunction determining unit 146 does not sense the change in the detection result of the seat belt switch 132 during the time period from the entering of the driver into the vehicle 100 up to the reaching of the running speed of the vehicle 100 to the predetermined speed, and thus determines that the seat belt switch 132 is malfunctioning. Note that the malfunction in which the seat belt switch 132 is fixed in the unfastened state (ON) is referred to as an "unfastened state fixed malfunction".

Likewise, under a circumstance in which the seat belt switch 132 is malfunctioning and thus fixed in the fastened state (OFF), the detection result derived from the seat belt switch 132 keeps on indicating the fastened state even before the driver enters the vehicle 100 or fastens the seat belt 116, and the fastened state does not change even when the driver fastens the seat belt 116 as illustrated in FIG. 2C. Hence, the malfunction determining unit 146 does not sense the change in the detection result of the seat belt switch 132 during the time period from the entering of the driver into the vehicle 100 up to the reaching of the running speed of the vehicle 100 to the predetermined speed, and thus determines that the seat belt switch 132 is malfunctioning. Note that the malfunction in which the seat belt switch 132 is fixed in the fastened state (OFF) is referred to as a "fastened state fixed malfunction". In the following, a description is given of one specific but non-limiting flow of a determination process performed by the malfunction determining unit 146.

Note that, in the event of the occurrence of the malfunction in which the seat belt switch 132 is fixed in the fastened state (OFF) or has the "fastened state fixed malfunction", the seat belt switch 132 still continues to detect the state as the fastened state even when the driver releases the seat belt 116 (i.e., even when the state is placed into the unfastened state), meaning that any shift range may not be switched to the parking range. Hence, the malfunction determining unit 146 may determine, as malfunction, only a state in which the seat belt switch 132 is fixed in the fastened state (OFF) as illustrated in FIG. 2C.

[Determination Process Performed by Malfunction Determining Unit 146]

Figure 3:
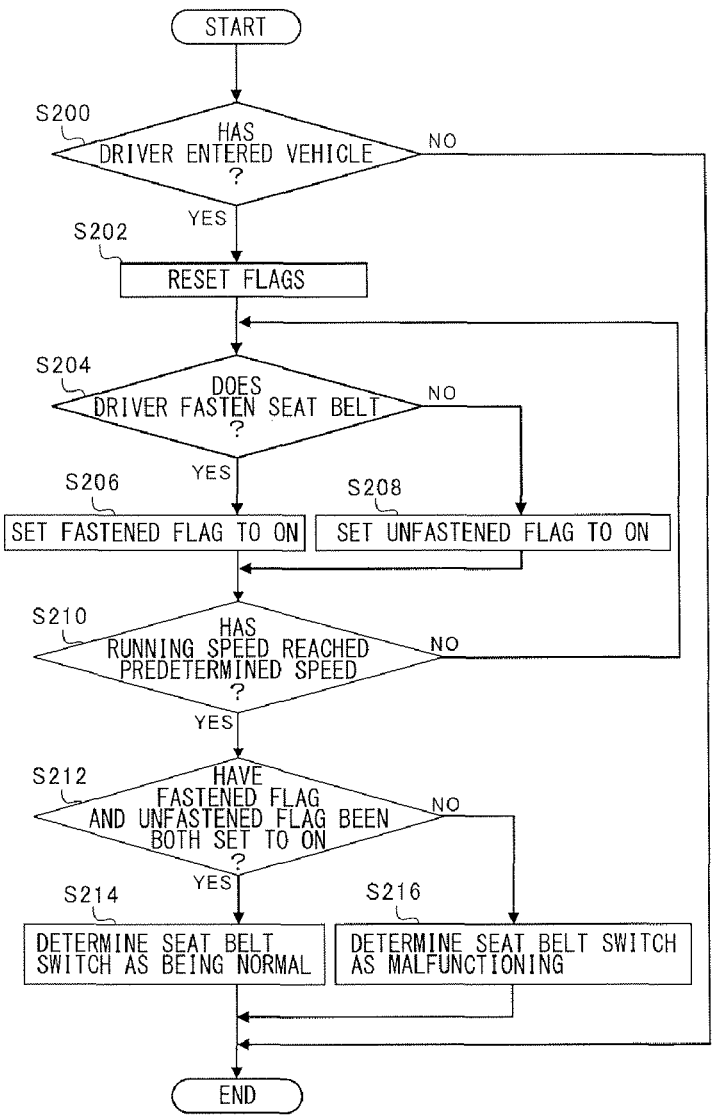
FIG. 3 is a flowchart illustrating a determination process performed by a malfunction determining unit.

FIG. 3 is a flowchart illustrating a determination process performed by the malfunction determining unit 146. Referring to FIG. 3, the malfunction determining unit 146 first determines whether or not a driver has entered the vehicle 100, based on whether or not a door lock of one of the doors 112 is unlocked (S200). When the malfunction determining unit 146 has determined that the door lock is unlocked and thus the driver has entered the vehicle 100 (YES in S200), the malfunction determining unit 146 resets a fastened flag and an unfastened flag to OFF (S202). On the other hand, when the malfunction determining unit 146 has determined that the door lock is not unlocked and thus the driver has not entered the vehicle 100 (NO in S200), the malfunction determining unit 146 ends the determination process performed by the malfunction determining unit 146. As used herein, the term "fastened flag" refers to a flag that indicates whether or not the seat belt switch 132 has detected the fastened state, in which "ON" indicates that the fastened state has been detected, and "OFF" indicates that the fastened state has not been detected. The term "unfastened flag" refers to a flag that indicates whether or not the seat belt switch 132 has detected the unfastened state, in which "ON" indicates that the unfastened state has been detected, and "OFF" indicates that the unfastened state has not been detected.

Then, the malfunction determining unit 146 determines whether or not the seat belt switch 132 has detected the fastened state (S204). When the seat belt switch 132 has detected the fastened state (YES in S204), the malfunction determining unit 146 sets the fastened flag to ON (S206). On the other hand, when the seat belt switch 132 has not detected the fastened state (NO in S204), the malfunction determining unit 146 sets the unfastened flag to ON (S208).

Then, the malfunction determining unit 146 determines whether or not a running speed of the vehicle 100 has reached a predetermined speed (S210). When the running speed of the vehicle 100 has not reached the predetermined speed (NO in S210), the malfunction determining unit 146 repeats the processes from the fastened state determining step (S204). On the other hand, when the running speed of the vehicle 100 has reached the predetermined speed (YES in S210), the malfunction determining unit 146 determines whether or not the fastened flag and the unfastened flag have been both set to ON (S212). When both of the fastened flag and the unfastened flag indicate ON (YES in S212), the malfunction determining unit 146 determines that the seat belt switch 132 is not malfunctioning, i.e., is normal (S214), and ends the determining process performed by the malfunction determining unit 146. On the other hand, when one or both of the fastened flag and the unfastened flag indicate OFF (NO in S212), the malfunction determining unit 146 determines that the seat belt switch 132 is malfunctioning (S216), and ends the determining process performed by the malfunction determining unit 146.

[Auto Parking Control]

The auto parking controller 148 executes an auto parking control, based on detection results derived from the respective switches, sensors, or their equivalents that detect corresponding vehicle states attributed to respective behaviors of the driver. The term "auto parking control" refers to a control in which any shift range is switched to the parking range irrespective of a state of the shift ranges. A description is given here of the present implementation by referring to a non-limiting example in which the auto parking controller 148 executes the auto parking control, based on detection results derived from the respective seat belt switch 132 and door switch 130. More specifically, the auto parking controller 148 executes the auto parking control that switches any shift range to the parking range, on condition that the seat belt 116 is not fastened by the driver and the door 112 at the driver's seat 114 is open, i.e., the seat belt switch 132 has detected the unfastened state and the door switch 130 has detected that the door 112 at the driver's seat 114 is open.

Note that the occurrence of the malfunction of the seat belt switch 132 for some reason may prevent the auto parking controller 148 from switching any shift range to the parking range. For example, under circumstances where, without limitation, the seat belt switch 132 still detects the fastened state (i.e., the occurrence of the fastened state fixed malfunction) despite the releasing of the seat belt 116 by the driver (i.e., the unfastened state) as described above, there is a possibility that the auto parking controller 148 fails to switch any shift range to the parking range. The present implementation thus executes the auto parking control on the basis of the determination result derived from the malfunction determining unit 146, in addition to the detection result derived from any switch, sensor, or equivalent.

More specifically, an event that the door switch 130 detects that the door 112 at the driver's seat 114 is open allows the auto parking controller 148 to execute the auto parking control irrespective of the detection result derived from the seat belt switch 132, on a condition that the seat belt switch 132 is determined by the malfunction determining unit 146 as malfunctioning. The seat belt switch 132 may serve as the first detector, and the door switch 130 may be a non-limiting example of a "second detector".

Figure 4:
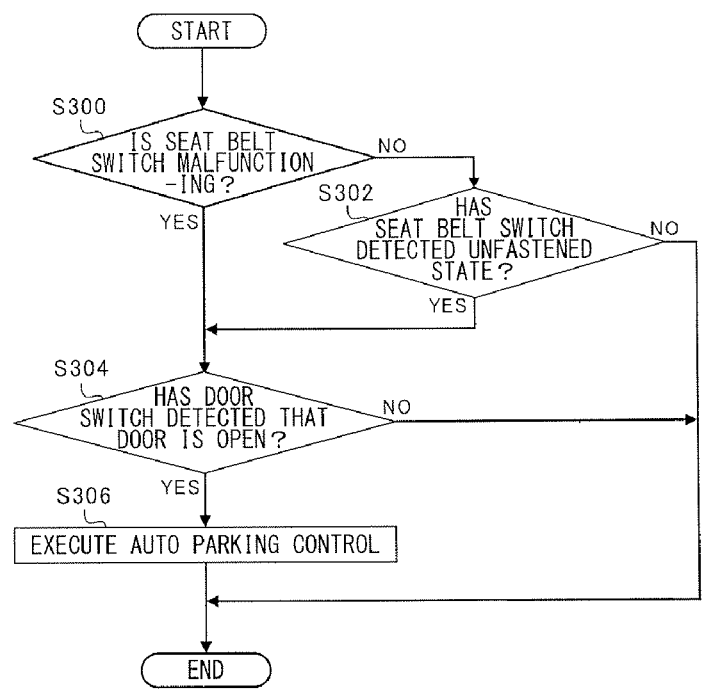
FIG. 4 is a flowchart illustrating a process performed by an auto parking controller.

FIG. 4 is a flowchart illustrating a process performed by the auto parking controller 148. First, the malfunction determining unit 146 determines whether or not the seat belt switch 132 is malfunctioning (S300). When the malfunction determining unit 146 has determined that that the seat belt switch 132 is not malfunctioning (NO in S300), the malfunction determining unit 146 determines whether or not the seat belt switch 132 has detected the unfastened state (ON) (S302).

When the malfunction determining unit 146 has determined that the seat belt switch 132 has detected the unfastened state (YES in S302) or that the seat belt switch 132 is malfunctioning (YES in S300), the auto parking controller 148 determines whether or not the door switch 130 has detected that the door 112 at the driver's seat 114 is open (S304).

When the auto parking controller 148 has determined that, the door switch 130 has detected that the door 112 at the driver's seat 114 is open (YES in S304), the auto parking controller 148 executes the auto parking control (S306), and ends the process performed by the auto parking controller 148.

On the other hand, when the malfunction determining unit 146 has determined that the seat belt switch 132 is not malfunctioning (NO in S300) and the seat belt switch 132 has not detected the unfastened state (NO in S302), or when the door switch 130 has not detected that the door 112 at the driver's seat 114 is open (NO in S304), the auto parking controller 148 ends the process performed by the auto parking controller 148 without executing the auto parking control.

In other words, when the malfunction determining unit 146 has determined that the seat belt switch 132 is not malfunctioning, the auto parking controller 148 executes the auto parking control, based on the detection results derived from the seat belt switch 132 as well as from any other switch, sensor, or equivalent. On the other hand, when the malfunction determining unit 146 has determined that the seat belt switch 132 is malfunctioning, the auto parking controller 148 executes the auto parking control, based only on the detection result derived from any other switch, sensor, or equivalent, excluding the detection result derived from the seat belt switch 132.

According to the present implementation of the technology, it is therefore possible to switch any shift range to a parking range properly even upon occurrence of malfunction of a device such as a switch and a sensor that detects a state of a vehicle.

[Other Implementations]

In the foregoing implementation, described is a non-limiting example in which the auto parking controller 148 executes the auto parking control on the basis of the detection result derived from the door switch 130 (the second detector), on the condition that the seat belt switch 132 (the first detector) is determined by the malfunction determining unit 146 as malfunctioning. In any other implementation, the malfunction determining unit 146 may determine malfunction of any switch, sensor, or equivalent (the first detector) selected among various switches, sensors, or equivalents provided in the vehicle 100. The first detector detects a vehicle state attributed to a behavior of a driver (the first vehicle state). When the malfunction determining unit 146 has determined that the first detector is malfunctioning, the auto parking controller 148 may execute the auto parking control, based on the detection result derived from the second detector, irrespective of the detection result derived from the first detector. The second detector detects a second vehicle state attributed to a behavior of the driver and different from the first vehicle state.

Besides the seat belt switch 132 and the door switch 130, the first detector or the second detector may be any switch, sensor, or equivalent that detects a vehicle state, including a seating sensor without limitation. The seating sensor may detect that a driver is seated, through detecting whether or not a load applied to the driver's seat 114 upon seating of the driver on the driver's seat 114 following entering of the driver into the vehicle 100 is equal to or greater than a predetermined weight value (i.e., detects whether or not the driver is seated).

The malfunction determining unit 146 may determine that the switch, the sensor, or the equivalent is malfunctioning, based on the following example conditions.

In an example of the door switch 130, the malfunction determining unit 146 may determine that the door switch 130 is malfunctioning, on a condition that the malfunction determining unit 146 senses no change in the detection result derived from the door switch 130, during a time period from a timing at which the driver unlocks the door lock of the door 112 at the driver's seat 114 (from a timing at which the driver enters the vehicle 100) up to a timing at which the running speed of the vehicle 100 reaches the predetermined speed. Further, when the door switch 130 is not malfunctioning, the auto parking controller 148 executes the auto parking control, on conditions that the detection result derived from any other switch, sensor, or equivalent has satisfied a predetermined condition and that the door switch 130 has detected that the door 112 at the driver's seat 114 is open. On the other hand, when the door switch 130 is malfunctioning, the auto parking controller 148 executes the auto parking control, on a condition that the detection result derived from any other switch, sensor, or equivalent has satisfied the predetermined condition, irrespective of the detection result derived from the door switch 130.

In an example of the seating sensor, the malfunction determining unit 146 may determine that the seating sensor is malfunctioning, on a condition that the malfunction determining unit 146 senses no change in a detection result derived from the seating sensor, during a time period from a timing at which the driver unlocks the door lock of the door 112 at the driver's seat 114 (from a timing at which the driver enters the vehicle 100) up to a timing at which the running speed of the vehicle 100 reaches the predetermined speed. Further, when the seating sensor is not malfunctioning, the auto parking controller 148 executes the auto parking control, on conditions that the detection result derived from any other switch, sensor, or equivalent has satisfied a predetermined condition and that the seating sensor has detected the load that is less than the predetermined weight value. On the other hand, when the seating sensor is malfunctioning, the auto parking controller 148 executes the auto parking control, on a condition that the detection result derived from any other switch, sensor, or equivalent has satisfied the predetermined condition, irrespective of the detection result derived from the seating sensor.

The implementations of the technology each may be applied to, for example but not limited to, an automatic transmission that utilizes the shift-by-wire system in which the shift ranges are automatically switched from one to another with use of an actuator. In particular, the implementations of the technology each may be applied to, for example but not limited to, a shift-by-wire control apparatus that forcibly switches any shift range to the parking range in response to a state of a vehicle.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A shift-by-wire control apparatus that drives, based on an electrical signal corresponding to a shift range selected by a shift lever, an actuator to perform a shift change, the shift-by-wire control apparatus comprising:
- a first detector that detects a first vehicle state attributed to a behavior of a driver;
- a second detector that detects a second vehicle state, the second vehicle state being attributed to a behavior of the driver and being different from the first vehicle state;
- an auto parking controller that executes an auto parking control irrespective of a state of the shift range selected by the shift lever, on conditions that a detection result derived from the first detector and a detection result derived from the second detector satisfy respective predetermined conditions, the auto parking control allowing the state of the shift range to be switched to a parking range; and
- a malfunction determining unit that determines that the first detector is malfunctioning, on a condition that the first detector fails to detect a change in the first vehicle state; and
- the auto parking controller executing, based on the detection result derived from the second detector, the auto parking control irrespective of the detection result derived from the first detector, on a condition that the first detector is determined by the malfunction determining unit as malfunctioning.

2. The shift-by-wire control apparatus according to claim 1, wherein the first detector is a seat belt switch that detects that the driver fastens a seat belt, the second detector is a door switch that detects that a door of a vehicle is open or closed, the malfunction determining unit determines that the seat belt switch is malfunctioning, on a condition that the malfunction determining unit senses no change in the detection result derived from the seat belt switch, during a time period from a timing at which the driver enters the vehicle up to a timing at which a running speed of the vehicle reaches a predetermined speed, and an event that the door switch detects that the door is open allows the auto parking controller to execute the auto parking control irrespective of the detection result derived from the seat belt switch, on the condition that the seat belt switch is determined by the malfunction determining unit as malfunctioning.

3. The shift-by-wire control apparatus according to claim 1, wherein the first vehicle state is any one of whether the seat belt is fastened by the driver, whether the door of the vehicle is open or closed, and whether the driver is seated, and the second vehicle state is any one of whether the seat belt is fastened by the driver, whether the door of the vehicle is open or closed and whether the driver is seated, and different from the first vehicle state.

* * * * *